(12) United States Patent
Newbery

(10) Patent No.: US 8,982,181 B2
(45) Date of Patent: Mar. 17, 2015

(54) DIGITAL STEREO PHOTOGRAPHIC SYSTEM

(75) Inventor: Billy Newbery, San Diego, CA (US)

(73) Assignee: Newbery Revocable Trust Indenture, San Diego, CA (US)

( * ) Notice: Subject to any disclaimer, the term of this patent is extended or adjusted under 35 U.S.C. 154(b) by 1143 days.

(21) Appl. No.: 11/818,519

(22) Filed: Jun. 13, 2007

(65) Prior Publication Data

US 2007/0296809 A1 Dec. 27, 2007

Related U.S. Application Data

(60) Provisional application No. 60/813,052, filed on Jun. 13, 2006.

(51) Int. Cl.
| | |
|---|---|
| *H04N 13/00* | (2006.01) |
| *H04N 13/02* | (2006.01) |
| *G02B 21/22* | (2006.01) |
| *H04N 13/04* | (2006.01) |
| *G02B 27/01* | (2006.01) |

(52) U.S. Cl.
CPC ............ *H04N 13/0239* (2013.01); *G02B 21/22* (2013.01); *G02B 2027/0134* (2013.01); *G02B 2027/0138* (2013.01); *H04N 13/044* (2013.01)
USPC .............................................. 348/42; 348/49

(58) Field of Classification Search
CPC ............... G02B 2027/0134; G02B 2027/0138; G02B 21/22
USPC ................ 348/42, 49, 50, E13.014, E13.041, 348/E13.071, E13.074
See application file for complete search history.

(56) References Cited

U.S. PATENT DOCUMENTS

| | | | |
|---|---|---|---|
| 5,677,728 A | 10/1997 | Schoolman | |
| 5,752,111 A | 5/1998 | Morton | |

(Continued)

FOREIGN PATENT DOCUMENTS

| | | |
|---|---|---|
| JP | 2000102040 | 4/2000 |
| JP | 200232916 | 8/2002 |

(Continued)

*Primary Examiner* — Lashonda Jacobs
(74) *Attorney, Agent, or Firm* — Gary L. Eastman, Esq.

(57) ABSTRACT

The invention provides a complete system for three-dimensional (3D) (stereo) still photography in a digital format. This includes capturing the image or photo, viewing, printing and projecting it. Intermediate steps would include downloading images to a computer, editing, enhancing or modifying, saving, recording photo images to other storage medium, and the printing of still photos. This invention is a significant advancement of the traditional analog film stereo slides, in that the digital format will allow viewing of the image in the camera in 3D, prior to, during, immediately after exposure and at any other time after exposure. With significant computer processing capability after exposure in editing, enhancing, color correcting, adding text and art, the images are further improved. The system includes the ability to view images, in 3D (stereo), in the camera, in a hand held viewer, on a computer screen on a standard television set as well as printed pairs or in anaglyph formats. The images can also be viewed with conventional digital projectors using conventional polarized glasses. The camera is also a significant advancement over the standard digital still cameras because it provides the three-dimensional image capture in a digital format. It also retains the full 2-dimensional capability of digital photography.

20 Claims, 12 Drawing Sheets

(56) References Cited

U.S. PATENT DOCUMENTS

| | | | |
|---|---|---|---|
| 5,784,525 A * | 7/1998 | Bell | 386/228 |
| 6,128,037 A * | 10/2000 | Anderson | 348/231.4 |
| 6,271,876 B1 * | 8/2001 | McIntyre et al. | 348/46 |
| 6,326,994 B1 * | 12/2001 | Yoshimatsu | 348/46 |
| 6,388,666 B1 * | 5/2002 | Murray | 345/473 |
| 6,429,867 B1 * | 8/2002 | Deering | 345/423 |
| 6,512,892 B1 * | 1/2003 | Montgomery et al. | 396/326 |
| 6,545,701 B2 * | 4/2003 | Sinclair et al. | 348/36 |
| 6,570,566 B1 * | 5/2003 | Yoshigahara | 345/427 |
| 6,639,649 B2 * | 10/2003 | Fredlund et al. | 352/12 |
| 6,697,573 B1 * | 2/2004 | Adkins | 396/324 |
| 6,748,105 B1 * | 6/2004 | Mancuso et al. | 382/154 |
| 6,791,598 B1 * | 9/2004 | Luken et al. | 348/36 |
| 6,809,771 B1 * | 10/2004 | Hamaguchi et al. | 348/335 |
| 6,864,911 B1 * | 3/2005 | Zhang et al. | 348/42 |
| 6,894,686 B2 * | 5/2005 | Stamper et al. | 345/419 |
| 7,061,532 B2 | 6/2006 | Silverstein | |
| 7,106,369 B2 * | 9/2006 | Baron | 348/231.4 |
| 7,148,916 B2 | 12/2006 | Fujiwara | |
| 7,180,540 B2 * | 2/2007 | Son | 348/231.4 |
| 7,181,061 B2 | 2/2007 | Kawano et al. | |
| 7,349,570 B2 * | 3/2008 | Chen | 382/154 |
| 7,611,293 B2 * | 11/2009 | Lee et al. | 396/428 |
| 7,755,673 B2 * | 7/2010 | Kurase | 348/231.1 |
| 7,856,180 B2 * | 12/2010 | Chishima | 396/324 |
| 2001/0014221 A1 | 8/2001 | Tomita | |
| 2002/0063783 A1 * | 5/2002 | Kurase | 348/232 |
| 2002/0113864 A1 | 8/2002 | Borner et al. | |
| 2002/0186466 A1 * | 12/2002 | Christian | 359/472 |
| 2004/0246333 A1 | 12/2004 | Steuart, III | |
| 2005/0175083 A1 | 8/2005 | Gutierrez Novelo | |
| 2005/0243418 A1 * | 11/2005 | La | 359/477 |
| 2005/0275731 A1 * | 12/2005 | Chianglin | 348/231.4 |
| 2006/0056836 A1 * | 3/2006 | Ramadan | 396/329 |
| 2006/0164509 A1 * | 7/2006 | Marshall et al. | 348/42 |
| 2006/0170785 A1 | 8/2006 | Mashitani et al. | |
| 2006/0204239 A1 * | 9/2006 | Inaba | 396/325 |
| 2006/0265425 A1 * | 11/2006 | Raff et al. | 707/200 |
| 2007/0025713 A1 * | 2/2007 | Hosono | 396/72 |
| 2007/0114345 A1 * | 5/2007 | Lee et al. | 248/166 |
| 2008/0225154 A1 * | 9/2008 | Pan et al. | 348/333.02 |
| 2009/0116732 A1 * | 5/2009 | Zhou et al. | 382/154 |
| 2009/0231441 A1 * | 9/2009 | Walker et al. | 348/207.1 |
| 2009/0238546 A1 * | 9/2009 | Zhong | 386/126 |

FOREIGN PATENT DOCUMENTS

| | | |
|---|---|---|
| JP | 2002374542 | 12/2002 |
| JP | 2003125424 | 4/2003 |
| JP | 2004120527 | 4/2004 |
| JP | 2005051505 | 2/2005 |
| JP | 2005062784 | 3/2005 |

* cited by examiner

DIGITAL STEREO PHOTOGRAPHIC SYSTEM

RELATED APPLICATIONS

This application claims the benefit of priority from U.S. Provisional Application Ser. No. 60/813,052, filed by this inventor on Jun. 13, 2006.

FIELD OF THE INVENTION

This invention relates generally to digital photography. This invention is more particularly, though not exclusively, useful as a stereoscopic digital imaging camera and system to provide enhanced digital image capture and viewing.

BACKGROUND OF THE INVENTION

Stereo photography was very popular in the world from the very beginning of photography. The stereoscope was invented in 1838. The earliest stereos were, mostly, made by commercial photographers, sold to the public and viewed with a hand held stereoscope. These devices are still available in kit form and on the used market, but it is not the best format today. Personal stereo still photography was quite popular in the 1950's, 1960's and some in the 1970's. Most cameras were 35 mm with two matched lenses, separated by a distance approximately equal to human eyes. Its popularity faded after the 1970's even though there are thousands of users yet today, some belonging to hundreds of stereo camera clubs throughout the world.

Stereo photography is extremely enjoyable as it adds a breathtaking depth dimension and makes you feel like you are there, where the photo was taken. It makes a photo become alive. Good stereo brings out a rash of comments by viewers—Exciting! Stupendous! Colossal! Wow! This is super! Really good! Cool! Ooh! I feel like I can reach out and touch it! This is great! Outstanding! Magnificent!

In light of the popularity of stereoscopic imaging and viewing, the present invention will reintroduce this phenomenal technique to the world—in a significantly better and more enhanceable format, and with vastly improved viewing methods. It will also provide the extremely important feature of immediate stereo viewing before and after exposure to instantly confirm that a satisfactory image was taken.

BRIEF SUMMARY OF THE INVENTION

The digital stereo photographic system of the present invention is a complete digital stereo photographic system consisting of new devices and technology with components that include the camera, digital stereo still hand-held viewer, viewer attachment, computer view, hand-held viewer, liquid crystal shutter glasses, projector and software for editing, adding text, adding audio, printing, slide bar, tripod, viewing glasses and a projector screen. The digital stereo photographic system has all of the features of a standard conventional still digital camera. The camera would have two identical lenses separated horizontally at a distance, which will provide a stereo effect. It also features two viewing liquid crystal displays and dual internal charge coupled devices. Left and right image pairs would be exposed simultaneously to the CCDs yet show in the LCD screens and recorded onto a memory device as separate images. The two identical lenses may be retractable and extendable and may be linked together.

Other attributes include zoom, view finder, electronic viewer, an image quality of at least 5 megapixels and preferably more. A memory format of JPEG or RAW may be produced, and exposure setting of automatic aperture priority, shutter priority or manual, an automatic or manual, internal or external built in flash with a hot shoe providing for an external flash device. The system of the present invention may accept any readily available memory card, and powered by any type of battery or external auxiliary power supply and input along with a SB port for transferring information.

The unit also notes provisions to add audio before or after exposure. Controls include a power on/off button, capture mode selector dial, shutter button, focus/depth-of-field setup, zoom lever, audio button, navigator buttons, menu button, display button, delete button and image selector. The view attachment is used to view the dual LCD screens in a 3D format after exposure and capture. This device will also be used to view stereo pairs, in the camera or hand held viewer that have been saved in a memory card. The photos may be viewed individually or in a slide show format.

The computer viewer is similar to the viewer attachment, except that it is specifically for viewing stereo images on a computer. These images to be viewed would be side-by-side and approximately 5 inches wide each. The hand held viewer is used to view digital stereo pairs in 3 dimensions. If consists of the viewer attachment and a dual LCD device. Liquid crystal shutter glasses for viewing 3D images on a computer screen prints or a standard TV will be included with the system of the present invention. These are used in conjunction with standard television sets and computer monitors. Software to create the VHS or DVD is included as part of the system of the present invention. The Liquid Crystal Shutter glasses are shaped like and worn as eyeglasses. A stereo projector is needed to project stereo stills on a screen for viewing by large audiences. The projector would be a dual projector system, or two standard digital projectors with unique characteristics for stereo.

Controls and software for photo selection and slide show characteristics are included. In-camera software would be provided to support all conventional digital camera functions, and stereo related function. Software for editing still photos would be similar to existing professional level photo editing software. General editing will be conducted on one image, but simultaneously recorded on the other image, whether visible on the computer screen or not. Further adjustments would be performed manually in a 3d view by use of the keyboard. Software for printing photos would be similar to existing professional level photo editing software. The photographic images are processed in the normal way and using the included software. Any standard DVD player or VCR when equipped with a 3D TV Box would be used to play the 3D images on a TV. Software for creating the slide show and copying to VHS or DVD is included.

A slide bar would be used for hypo stereo and hyper stereo photos. It may have a tripod attachment insert on the bottom and a camera attachment on the top for interfacing with these items.

BRIEF DESCRIPTION OF FIGURES

The nature, objects, and advantages of the present invention will become more apparent to those skilled in the art after considering the following detailed description in connection with the accompanying drawings, in which like reference numerals designate like parts throughout, and wherein.

DETAILED DESCRIPTION OF A PREFERRED EMBODIMENT

Figure 1:
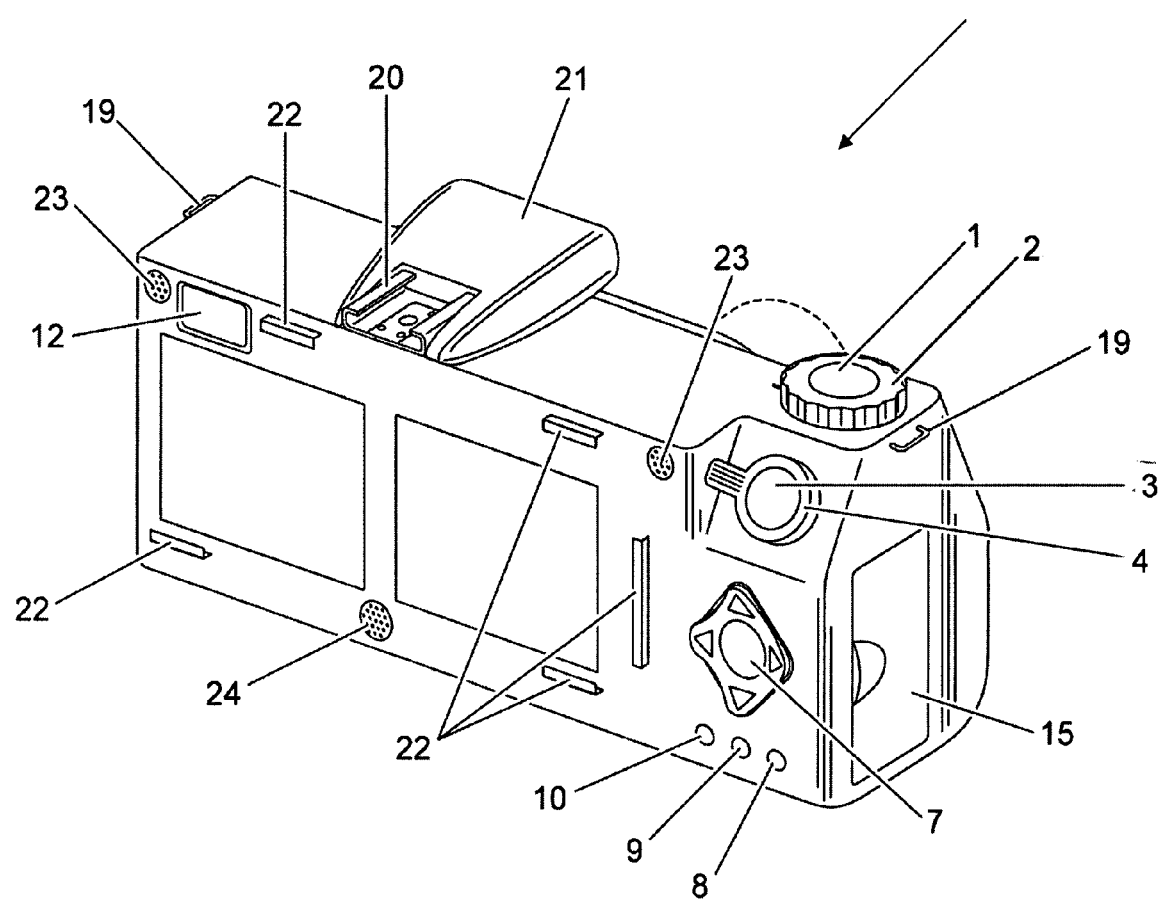
FIG. 1 illustrates the three dimensional photographing device (camera) from the rear/top/right point of view.

The digital stereo photographic system of the present invention is a complete digital stereo photographic system consisting of new devices and technology as identified below. In order to facilitate the discussion of the present invention, the various parts and components are generally listed in the following paragraph, and more fully described in subsequent paragraphs.

The Digital Stereo Photographic System would consist of the following major components:
  I. Camera, Digital Stereo Still (also a hand-held viewer)
  II. Viewer Attachment
  III. Computer Viewer
  IV. Hand-held viewer
  V. Liquid Crystal Shutter glasses
  VI. Projector
  VII. Software for editing, adding text, adding audio, printing, etc.
  VIII. Digital Video Disc (DVD) Player and Video Cassette Recorder (VCR)
  IX. Accessories:
  Slide bar
  Tripod
  Viewing glasses
  Projector screen
I. Camera, Digital Stereo Still The stereo digital still camera, also known as a 3D camera has all of the standard features of a conventional digital still camera, including but not limited to the following:
  Date and time recording
  Exposure and aperture data
  Image stabilization
  Instant review
  Image Deletion
  Selective review
  Slide show features
  Movie picture mode (Video)
  Macro mode
  Resolution selection
  Sensitivity (ISO) selection
  Time-lapse exposure
  Self-timer
  Histogram presentation
  Auto power off at selected time
  Capture mode selection The camera has two identical lenses separated horizontally. Any distance will provide a stereo effect, but since the eyes are about 2.74 inches (center-to-center) this will be the norm and most realistic. It also has two viewing Liquid Crystal Display (LCD) screens separated by approximately 2.50 inches (center-to-center) on the back side and dual internal Charge Coupled Devices (CCDs). Left and Right Image pairs would be exposed simultaneously to the CCDs, shown in the LCD screens, identified with a number followed by an L or R, for left or right, and recorded onto a memory device as separate images. Photos would be viewed in the camera with the unaided eye or more easily with the viewer attachment described below.

Lenses—Two identical, with linked iris, shutter, etc. and a short focal length to provide maximum depth of field and a wide angle of view. For compactness, the lenses may be retractable/extendable and may be linked together.

Zoom—3× optical or more.

Viewfinder—Optical, centered and linked to zoom (non-stereo).

Electronic Viewer—Matched LCD screens approximately 2 inches by 2 inches and spaced horizontally approximately 2.5 inches center-to-center, daylight compatible, high resolution.

Image quality—At least 5 megapixels for each CCD, 10 or more is desirable.

Resolution per exposure—Resolution and pixel size selectable from the menu. Sizes up to the maximum with the following height to width ratios 4×5, 4×6, 5×7, 1×1, and the standard film stereo camera ratio 24×23 and user custom selection.

Memory format—JPEG (Joint Photographic Experts Group) and RAW, selectable from menu Image selection—Selectable from the menu: Left only, right only or both images for exposure (both would be the default). This feature is used in taking hyper-stereo photos (lenses much farther apart than the norm) and often used for distant subjects to give greater depth and used in taking hypo-stereo photos (lenses closer together from the norm), often used for close-up subjects to make the depth more realistic. After exposing the first image, the user would switch to the other side, and move the camera the appropriate distance. The first image would remain visible in the LCD and the second image to be captured would be visible in the other LCD allowing precise alignment. In addition, more than one separation can be tried by selecting this option from the menu. In this case, the first image exposed will be visible in the LCD and the camera repositioned for the second image, Both techniques require the use of a slide bar mounted on a tripod or other means of varying the lens separation for each photo.

Exposure—Selectable from the menu: Automatic, aperture priority, shutter priority, or manual (Automatic would be the default).

Flash—Selectable from the menu: Automatic or manual, internal or external. A flash is built in and centered. A hot shoe is incorporated on the top center providing for an external flash device. Red-eye reduction option would be included in the menu.

Memory Card—Compact Flash Type I and Type II and Microdrive capability or equivalent.

Power—Battery, AA size (rechargeable) is recommended. External auxiliary power supply and input to camera also included.

Audio—The camera includes provisions to add audio, for each photo pair. The length of time is selectable in the menu with a default of 20 seconds. Capability for audio can be added before or after exposures by pressing an audio control button and following instructions on an LCD monitor. Audio added prior to exposure would be included with the next exposure. After exposure, while viewing the selected image in an LCD monitor, the audio would be added to the selected image. Audio can also be added to any image by a computer Exemplary Camera Controls, as Shown in FIG. 1:

1. Power on/off button—Activates camera and extends lens's
2. Capture mode selector dial—Selects the following modes: 3D (3 Dimensional Stereo), 2D (2 Dimensional), movie (moving images up to 30 seconds or more), night (dark scenes), filtered (color filters including black and white, sepia, red, green, blue and yellow). All in 3D except 2D mode.
3. Shutter button—An initial half-way press will enable the Photo or Capture View on both LCDs (see FIG. 12 for a typical configuration) activate focus and set other functions. A pair of red brackets and the aperture/shutter speed will be also shown on one LCD (can be both). When ready for exposure, the red brackets will change to green and move closer together. This view will stay on for several seconds unless the DOF lever is moved, after the half-way press is released. Final pressing the shutter button will expose the images.
4. Focus/Depth-of-Field (DOF)—Selectable in Setup— Automatic Only, DOF Only or Auto/DOF. In the Auto/DOF mode, the focus would be automatic as described above, with DOF manual override. To engage the DOF feature—after the shutter button is pressed half-way and the Photo View is present, move the depth-of-field lever to enable the DOF view (See FIG. 1 for a typical configuration). A range scale will appear on an LCD or both) screen showing distance from camera scale range (near zero to infinity) and adjacent to that, a sliding depth-of-field bar showing the range of sharp focus with a red line for the focus distance—move the lever up or forward to move the depth-of-field bar up, or move the lever down to move the depth-of-field down or closer. As the depth-of-field bar moves slowly, the range scale and the red line focus depth would move in the opposite direction a little faster. The dimensions of the range would be feet/inches or metric (selectable in Setup) and arranged in a logarithmic order with infinity approximately at the 100-foot level. The depth-of-field range would be calculated by the internal software. The depth-of field range is a function of aperture, focal length and focus distance. In the Auto Only mode, the DOF lever would serve no function, and must be used in the DOF Only mode.
5. Zoom lever—Moving this lever would zoom the lens for detail inspection or a closer viewing aspect.
6. Audio button—Initial press of the button will enable the audio function and show "AUDIO ENABLED—PRESS TO START" in an LCD screen. Pressing the audio button again will start the recording and show, on the LCD monitor, a countdown of the remaining time. After recording, "PRESS TO PLAY AUDIO" will show on the LCD and pressing the button again will play the audio. The play audio function will remain enabled for 10 seconds.
7. Navigator buttons—Four way navigation buttons with center OK button.
8. Menu button—Pressing this button will bring up the menu. Navigation will be by the Navigator Buttons.
9. Display button—Pressing this button will show image number, date/time of exposure, and battery condition. Pressing this button again will add other details, including a histogram, aperture, shutter speed, recorded pixels, quality level, white balance, AE metering, and ISO speed
10. Delete button—Pressing the button will enable the delete function and show "DELETE CANCEL" on the LCD. The word CANCEL will be highlighted. For protection against accidental erasure, the navigation button must be used to highlight the word DELETE, and then pressing the center button will delete the captured photo.

Interfaces for the digital stereo photographic system of the present invention include, but are not limited to, the following:

Auxiliary power input from included power supply

USB (Universal Serial Bus) port to send and receive all data to and from a computer Audio/Video output to send signals to a VCR, DVD or TV set for recording or viewing. This video would be two-dimensional only.

Memory card

An exemplary embodiment of the present invention, and its exemplary configuration, is described as follows:

The camera will have a width of approximately 6.5 inches and a depth of approximately 3.5 inches, with lenses extended. A grip (extending forward about and inch from the main body) on the right side would house the batteries and the memory card. The power on/off button (1) and the capture mode selector dial (2) would encircle the on/off button. The shutter button (3) would be on the top and at the rear position of the grip (thumb operated). The focus/depth-of-field lever (4) to be on the top-aft position of the grip (thumb operated). The zoom lever (5) would encircle the audio button. The audio button (6) would be on top and at the forward position of the grip. A device such as standard four-button switch or a toggle switch (7) would be located on the back of the camera right hand side (clear of the viewer) to control the image access, selection and navigation. A center button would be the OK or SELECT button. Other buttons would include menu (8), display (9), and delete (10). (See FIGS. 1 and 2 for a typical configuration.)

II. Viewer Attachment

This device would be used to easily view the dual LCD screens in a 3D format for composition, depth, color, etc. of the photo being taken and for viewing after exposure. The camera can be used without this attachment. Images can be viewer with the unaided eyes in 2D or in 3D by parallel viewing with both eyes. The viewer would attach to the back of the camera or the hand held viewer easily and securely forming a light tight compartment, (except for the lenses). It is consists of two lenses, with focal lengths as needed to view the LCDs. Adjustments to include 1) simultaneous focus of both lenses and a micro focus of one lens (to match user eyes) and 2) interocular, the distance between the lenses from about 2.3 to 2.8 inches (nominal distance to be the same as the center-to-center distance of the LCD). An adjustment lock feature may be advisable. The design would be compatible with the eyes and nose of the user. (See FIG. 3 for a typical configuration.) There is no electronics in this device.

This device will also be used to view stereo pairs, in the camera or hand-held viewer, that have been saved in a memory card. The photos may be viewed individually or in a slide show format. Ability to select photo(s) for viewing or a slide show is included in the internal software of the camera and the hand held viewer.

III. Computer Viewer

This device would be similar to the viewer attachment above, except it would be specifically for viewing stereo pairs on the screen of a computer. The images to be viewed would be side by side and approximately 5 inches wide each. The viewing lens' would be similar to the viewer attachment except for focal length and with an additional wedge lens, if needed, to compensate for the larger image. Stereo images can also be viewed on the computer screen by conventional means—parallel, cross-eyed, shutter glasses or anaglyph.

IV. Hand-Held Viewer

This device is to be used to view digital stereo pairs in 3D without the camera. It consists of two parts—the viewer attachment as described above and a dual LCD device as follows: (See FIG. 4 for a typical configuration.)

The dual LCD device would be similar to the back of the camera with the dual LCD viewing screens and the viewer attaching feature. Memory card slot would be included. Viewing software would be the same as in the camera. Similar to the camera, a device such as standard four-button switch or a toggle switch would be located on the back of the viewer right hand side (clear of the viewer attachment) to control the menu access, selection and navigation. A center button would be the OK or SELECT button. Ability for selecting photos and slide show characteristics would be included in the software. Audio added to images would play as the image is displayed.

The viewer would be powered the same as the camera, i.e. any type of battery, however M batteries (rechargeable) is recommended. External auxiliary power supply and input to camera is included. An on/off button would enable the viewer.

Interfaces would be similar to the camera, for instance:
Auxiliary power input from included power supply
USB (Universal Serial Bus) port to send and receive all data to and from a computer
Audio/Video output to send signals to a VCR, DVD or TV set for recording or viewing. This video would be two-dimensional only.
Memory card V. Liquid Crystal Shutter Glasses This device is considered an excellent viewing medium for multiple viewers. It would be used in conjunction with standard television (TV) sets and computer monitors. These devices are currently on the commercial market and are readily available. Digital photographic stereo image pairs would be recorded on a video tape (VHS), or digital video disc (DVD). Software to create the VHS, or DVD in ones computer is included as part of the system. The left and right image signals would be transmitted to the TV alternating between left and right images and synchronized with the shutter glasses.

The Liquid Crystal Shutter (LCS) glasses are a device shaped like and worn as eyeglasses (can be worn over regular glasses). When the still images or the video is played by a Video Cassette Recorder (VCR) or a Digital Video Disc (DVD) player, an infrared signal is sent to the LCS to alternately block vision in the left or right eye synchronous with the respective right or left signal. This is commonly called PFS (page-flipped stereo).

VI. Stereo Projector

This device is needed to project stereo stills on to a screen for viewing by large audiences. The projector would be a dual (stereo) projector system or two standard Digital projectors with the following unique characteristics for stereo:

Inputs would come from the camera, hand held viewer or a computer via a USB connection. Software for photo selection and slide show characteristics are included.

The projector lenses would include interlocked zoom capability. Keystone protection would be desirable. The projection path would include a polarized filter with the left filter rotated 45 degrees from vertical polarization, and the right filter rotated in the opposite to 45 degrees from the vertical. Circular polarization may also be used.

Alignment controls would be desirable: 1. Leveling for the projector; 2. Simultaneous focus for the lenses (plus one lens with manual micro focus adjustment for matching both lenses); 3. Vertical adjustment of one or both lenses if necessary; 4. Horizontal adjustment of one or both lenses if necessary and 5. Vertical tilt of the projector.

Brightness: The projector would have maximum brightness, because of the loss of light through the polarized filters. Polarized glasses will be worn by the viewer to separate the stereo images left and right.

VII. Software

A. In-Camera

In-camera software would be provided to support all conventional digital camera functions, and including the stereo related functions, such as focus distance, depth-of field calculations and DOF bar, L/R/Both image selection, format, resolution, etc. Image selection for viewing or adding to a slide show is included.

B. Computer Still Photo Software

Software for editing still photos would be similar to existing professional level photo editing software with the following additional features related to stereo effects.

The software will include the ability to show both left and right images on the screen (standard side-by-side, and over/under format) and the ability to select left, right, or both images for editing. Other viewing formats would include interlaced, gray anaglyph, color anaglyph, LCD and pageflip. General editing will be conducted on one image, but simultaneously recorded on the other image, whether visible on the computer screen or not. Provisions to override this feature for specific applications would be included. Software instructions would recognize the subtle differences between the left and right images, because of the lens separation.

Editing that effects the entire image, such as brightness, contrast, intensity, equalization, color balance, gamma, hue/saturation/brightness, replace colors, sharpen, etc. will be performed on either individual image, but default matched by number on the other image, which can be changed if desired. The software for editing that effects only a portion of the image, such as masking, cloning, erasing, painting, etc. will allow for effect to be offset by the pixel differences between the image pairs, but performed on both at the same time. Because of the differences between the left and right image, the software will make allowances for effects not be performed equally on each image. Cropping will be performed on both images in the same proportion.

Horizontal and vertical alignment will be automatic or manual using aids such as an alignment grid and edge detection techniques. Horizontal alignment also controls the window position (see next paragraph). Individual images may be rotated to correct exposure errors, or for special effects.

The software will include provisions for window control. Stereo has the illusion of viewing the scene through a window. By that, your left eye will see things at the right edge of the scene that the right eye does not, and conversely, the right eye will see things at the left edge of the scene that left eye does not. This is the window effect, caused by the offset of the two lenses in the camera. Without moving the window, left and right images that are moved closer together, make the scene appear to be closer to the window. Conversely, left and right images that are moved farther apart, make the scene appear to move away from the window. Another way to look at it, without moving the scene images, moving the windows closer together the scene will appear to be farther back, or away, from the window. Conversely, again, moving the windows farther apart the scene will appear to be closer to the window, or even in front of the window. This technique is often used to pull an object closer to or even through the window. To use this feature, a bit of the scene width will be sacrificed. When you move a window, without moving the scene, a small portion of the scene would be lost and on the other side, a blank area will appear. When moving a window, both image windows would automatically be shrunk to compensate for this. It is like cropping without removing the area outside the crop. Basic window control will be accomplished by selecting a point on the image that would appear to be located at the window depth.

All adjustments would be performed manually or automatically in a 3D view by use of keyboard arrows (up/down and left/right), or a mouse device.

Text can be added as an object and will include a selection of apparent depth, i.e. none (in the same plane as the nearest object), deeper (text will appear back of the nearest object), or closer (text will appear in front of the apparent image). The text apparent depth, location and size, color, shadow, etc. will be editable as an object or a layer and seen in a 3D view.

Extra wide panoramic photos taken by swinging the camera about ⅔ of a view between exposures will be combined into a single panoramic stereo view using the stitching capability. For very wide photos, viewing may have to be by anaglyph, TV or projection techniques.

C. Printing Software

Software for printing photos would be similar to existing professional level photo editing software. Here we have the best of all worlds, printing 2D photos just like any standard digital system, or 3D stereo pairs that can be viewed in several ways. The following additional features are related to stereo effects.

Free-viewing. For viewing printed (or computer screen) stereo pairs without any optical aids. This is commonly referred to as parallel or cross-eyed viewing. The center-to-center distance of the two images is approximately 2.5 inches or less. For the parallel viewing, left images are placed on the left and right images are placed on the right and close together. The eyes should be focused at infinity (i.e. parallel) or a distant object (the eyes should not converge as if viewing a nearby object) such as that the left eye sees the left image and conversely the right eye sees the right image. Actually three images will appear and the center one is the stereo view. For cross-eye viewing, the left image is placed on the right side and the right image is placed on the left. To view, one must cross their eyes to see the stereo effect. The software will provide for selecting either technique as desired.

Optical Viewer. There are several optical viewers available on the open market for viewing side-by-side printed stereo pairs. Of olden times, the stereoscope is still very popular. By selecting the stereoscope format, the software will automatically set up the image pairs for printing. The software will also provide printed pair adjustments to control the image size, center-to-center separation, and window location as described above. The stereoscope format, commonly called the Holmes format is unique. The format is square or rounded corners and with or without the often preferred curved (dome) top side of each image. The software will provide this format selection. Text addition features will include font, color, and location control. Background color and photo color (i.e. natural, sepia, color tone, etc) will be selectable.

Anaglyph. This is a procedure whereby the stereo pairs are made through a red and cyan filters and then printed on top of each other with adjustable separation. The stereo image is viewed by using glasses with red and cyan lenses. The photographic images are processed in the normal way as described above and using the included software. Selecting the anaglyph format will automatically filter the images with the red and cyan and superimpose them on the computer screen. This presentation will be viewable on a computer screen with the standard red/cyan glasses. Printing capability is included and the printed anaglyph images will be viewed in the same manner.

Included in the anaglyph will be the ability to produce pop-up or phantograms. Pop-ups start with the camera taking a photo of objects on a flat surface such as a table. The angle of the camera to the horizontal plane is down from 30 to 45 degrees. A tripod and slide bar is required to get the proper lens separation. The software modifies the images to correct alignment errors and to prepare for viewing. Viewing is a very unique procedure. The printed anaglyph photo is placed on a horizontal surface such as a table. A very large photo may be placed on the ground or floor. The image is viewed wearing the red/cyan glasses and looking at an angle similar to the camera angle. The images appear to pop up into the air.

Anaglyph photos are an easy to share. The 3D photos can be mailed or e-mailed. All that is needed by the recipient is relatively cheap red/cyan glasses.

VIII. DVD Player and VCR

Any standard DVD Player or VCR, when equipped with a 3D TV Box such as X3D TV Box manufactured by X3D Technologies, would be used to play the 3D images on a TV. A standard Cathode Ray Tube (CRT) TV is required for current technologies. Viewing stereo images in a sequence is commonly called a slide-show (from the film format). Software for creating the slide-show and copying to a VHS tape or a DVD is included.

IX. Accessories

A. Slide Bar

This device would be used for hypostereo and hyperstereo photos. It must have a tripod attachment insert on the bottom and a camera attachment on the top for interfacing with these items. The device would allow adjustment (sliding) of the top section (with camera) left and right of center. The left and right images are taken separately (non-moving subject) using the slide bar to locate the lens separation. A measuring scale, in inches or centimeters, would be provided to accurately adjust the lens separation. It would have a center marking "0" and inch marks plus and minus from the zero point. In a preferred embodiment, the total adjustment would be approximately 6 to 8 inches (3 to 4 inches left and right of center). A built-in retractable scale in inches and centimeters up to about 36 inches long, would be desirable.

B. Tripod

A conventional standard tripod is included in the system.

C. Viewing Glasses

Devices for viewing 3D images on a computer screen, prints, or a standard TV is included in the system. Several commercial viewers are available, including the following:

Red/Cyan glasses for viewing anaglyph prints or computer screen anaglyph images. Conventional commercial glasses are available for this purpose.

Polarized glasses for viewing projected stereo. Conventional commercial glasses are available for this purpose.

Liquid crystal shutter glasses for viewing 3D images on a standard TV.

D. Projector Screen

A standard lenticular screen can be used with 3D photos and movies projected with polarized filters in front of the lenses and polarized glasses worn by the viewers.

One can also fashion a home version using large sheets of white paper attached to a wooden frame.

Now that a general overview of the components and system of the present invention has been introduced above, the following description refers to the specific drawings which embody those components and operational features.

Figure 2:
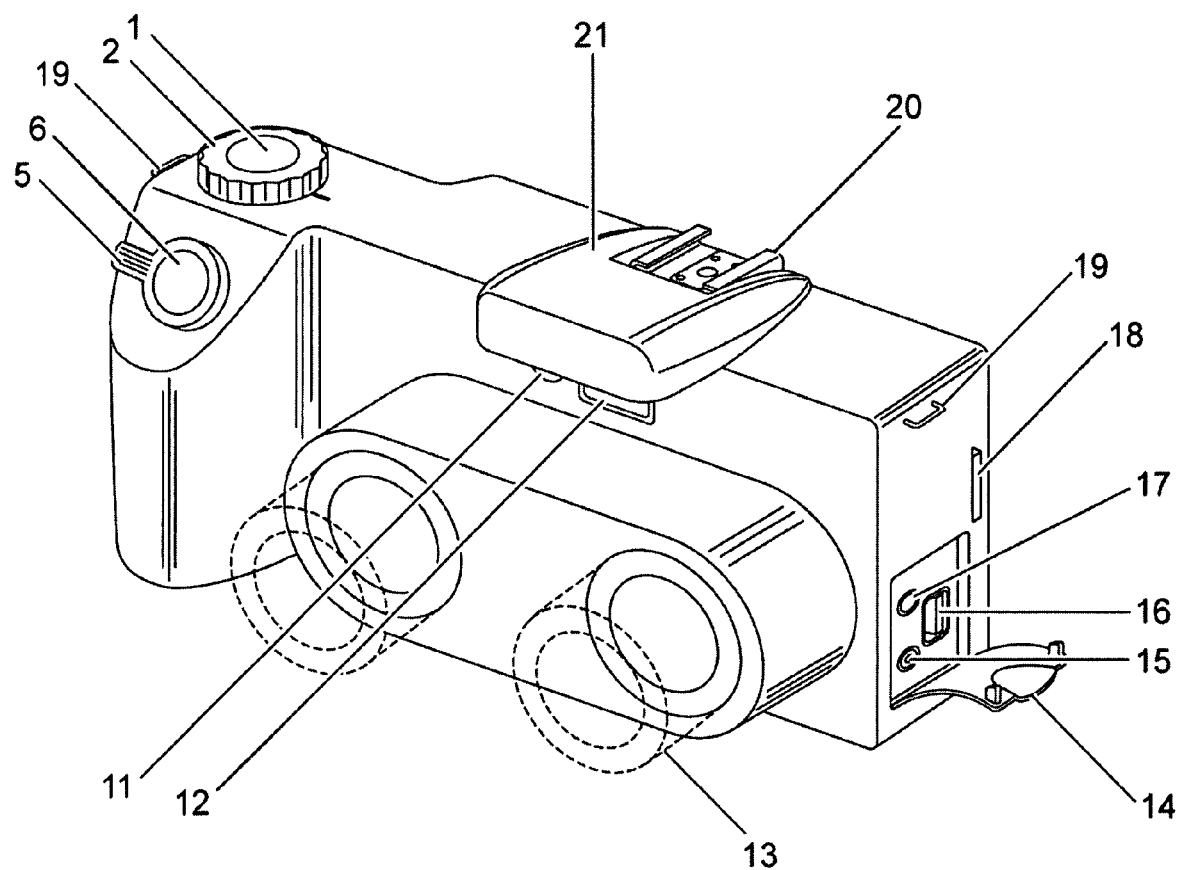
FIG. 2 illustrates the three dimensional photographing device (camera) from the front/top/left point of view.

FIGS. 1 and 2 illustrate the camera in a typical configuration and identifies all the controls and design characteristics.

Figure 3:
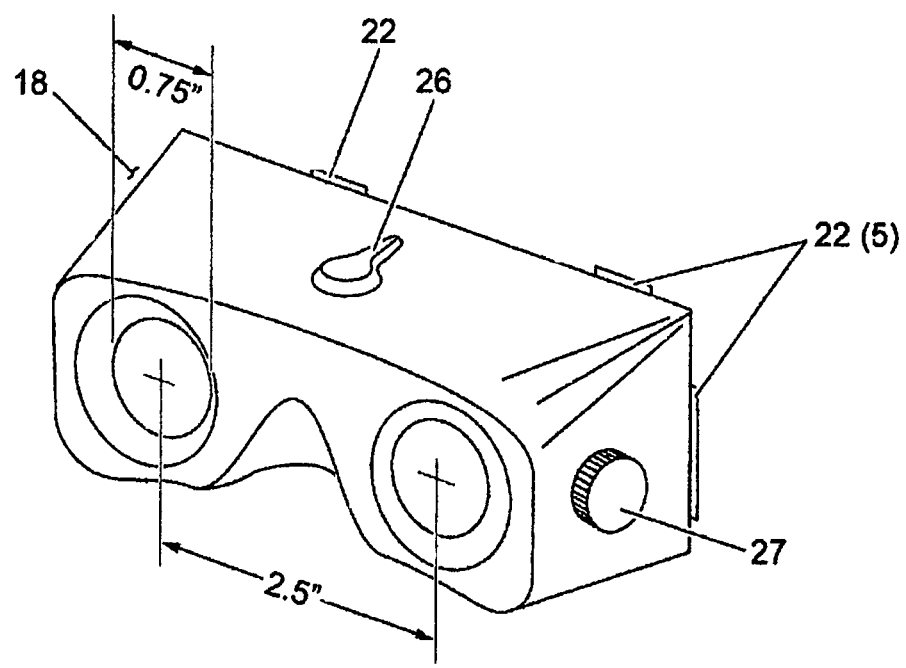
FIG. 3 illustrates the viewer attachment. When attached to the camera or the hand held viewer the scenes or captured scenes are viewed in three-dimensions (stereo)

FIG. 3 illustrates the viewer attachment view from the users side. The viewer would be configured to match up with the LCDs of the camera and easily attach.

Figure 4:
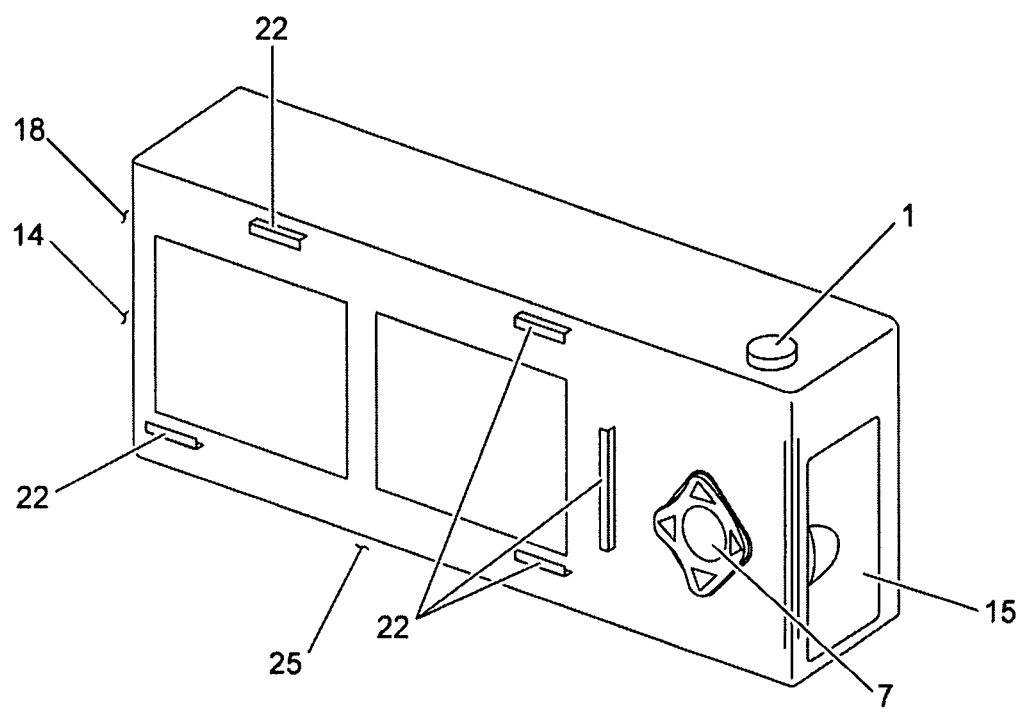
FIG. 4 illustrates the hand held viewing apparatus used to view captured photos and slide shows.

FIG. 4 illustrates the hand held viewer and identifies all the controls and design characteristics. The back is similar to the camera, and contains only that electronics needed for viewing images. Viewing can be by the unaided eyes or with the viewer attachment.

The Digital Stereo Photographic System components will be used in a variety of operational modes. These modes are defined as: 1) Camera Set Up, 2) Capture, 3) Computer Editing/Viewing, 4) Viewing in camera and hand held viewer, 5) Viewing on TV and 6) Viewing by Projection.

Figure 5:
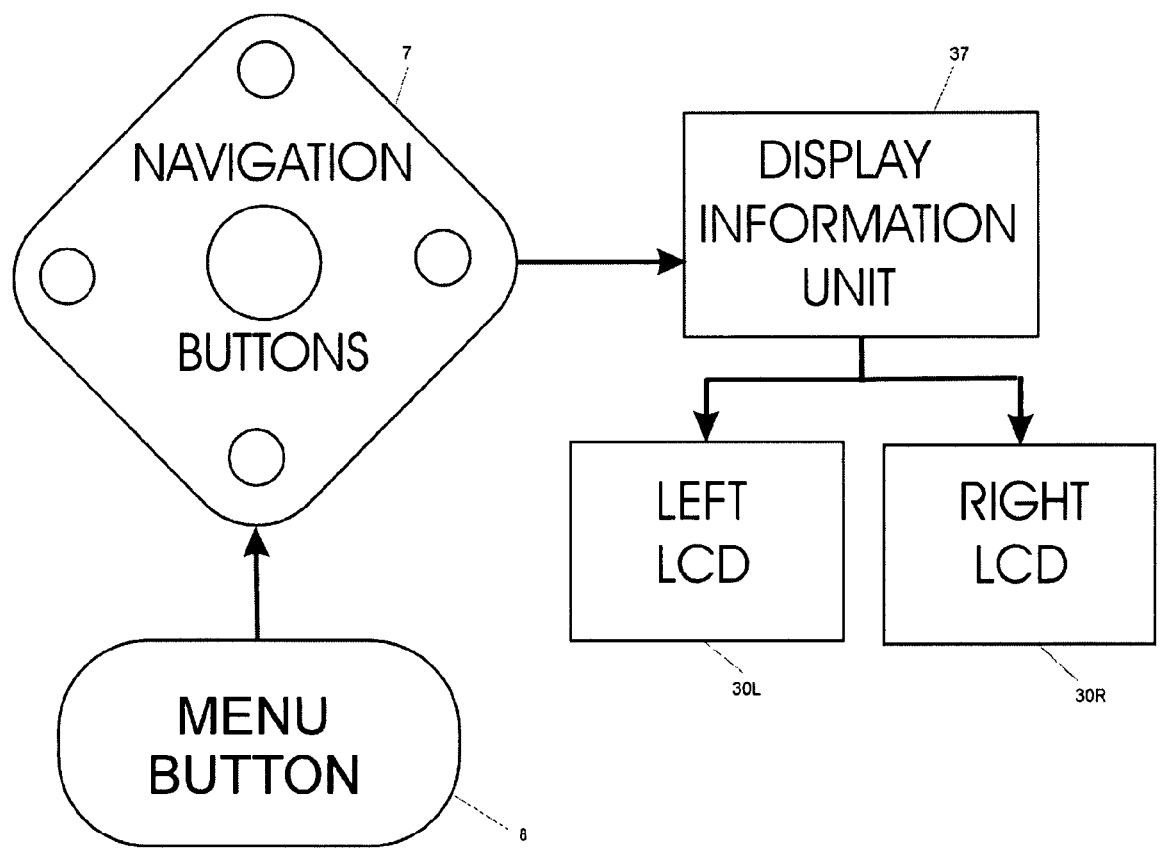
FIG. 5 is a block diagram illustrating the operation and flow of information in the camera set-up mode.

FIG. 5 illustrates the camera set up mode. This is the interface with all menu functions. Pressing the menu button 8 accesses the menu and the navigation buttons 7 are used to search through the menu to access the desired functions. The menu and data is processed by the display information unit 37 and displayed on the left and/or right LCD 30L and 30R.

Figure 6:
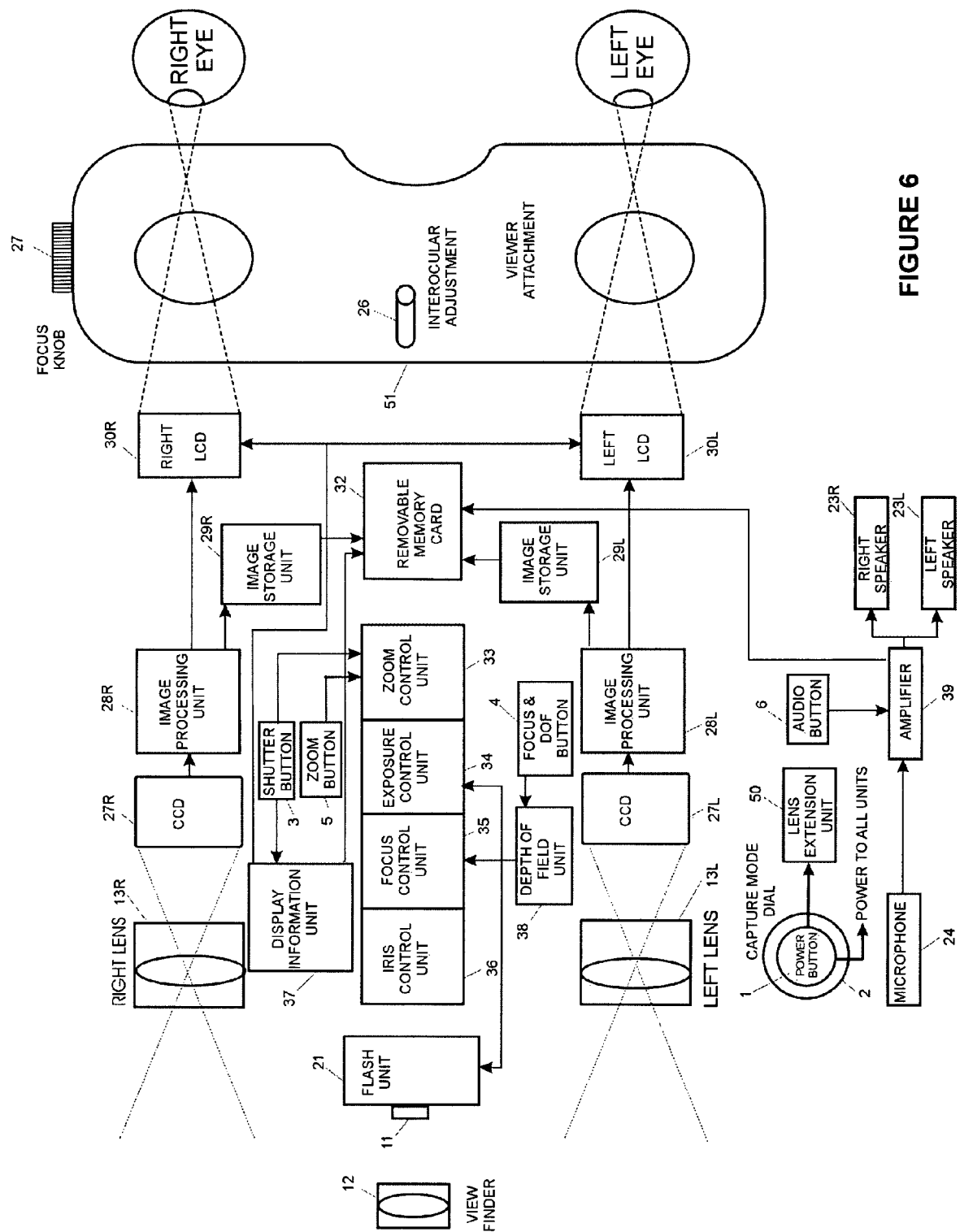
FIG. 6 is a block diagram illustrating the operation and flow of information in the camera capture mode.

FIG. 6 illustrates the camera capture mode. The camera is powered by internal batteries or an external power supply. Power is enabled by pressing the power button 1. This action supplies power to all mechanical and electronic units in the camera and extends the retracted lenses. The capture mode dial 2 is rotated to select the photographic style (3D, 2D, Movie or Filtered). All styles are 3 dimensional except 2D. The 3D style is described herein. For easy 3D viewing before and during exposure the viewer attachment may be in place on the camera. Light rays from the object would enter the left and right lens 13L and 13R and be projected onto the charge coupled Devices (CCDs) 27L and 27R. The formed image data is processed by the image processing units 28L and 28R, then sent to the image storage units 29L and 29R and to the Liquid Crystal Displays (LCDs) 30L and 30R for viewing in the camera directly or through the viewer attachment 51. Pressing the shutter button 3 half way enables the zoom control unit 33, the exposure control unit 34, the focus unit 35 and the iris control unit 36.

If zooming is desired, the zoom button 33 is rotated to activate. The focus control unit 35 performs focusing automatically unless the focus/DOF lever 4 is rotated for manual control. If focusing or changing the depth of field (DOF), the focus/DOF lever 4 is rotated activating the focus/DOF unit 38 and focus control unit 35. Exposure (shutter speed) is selected automatically by the exposure control unit 34, unless manual or shutter priority is selected from the menu. Iris opening is performed automatically by the iris control unit 36 unless manual or aperture priority is selected from the menu. When the image is satisfactory, the shutter button is pressed again all the way to activate the shutter. The image storage units format the images and associated significant data and stores it in the removable memory card 32. The associated data includes exposure information (i.e. shutter speed and f stop), date, time, capture number, ISO, and quality level.

Figure 8:
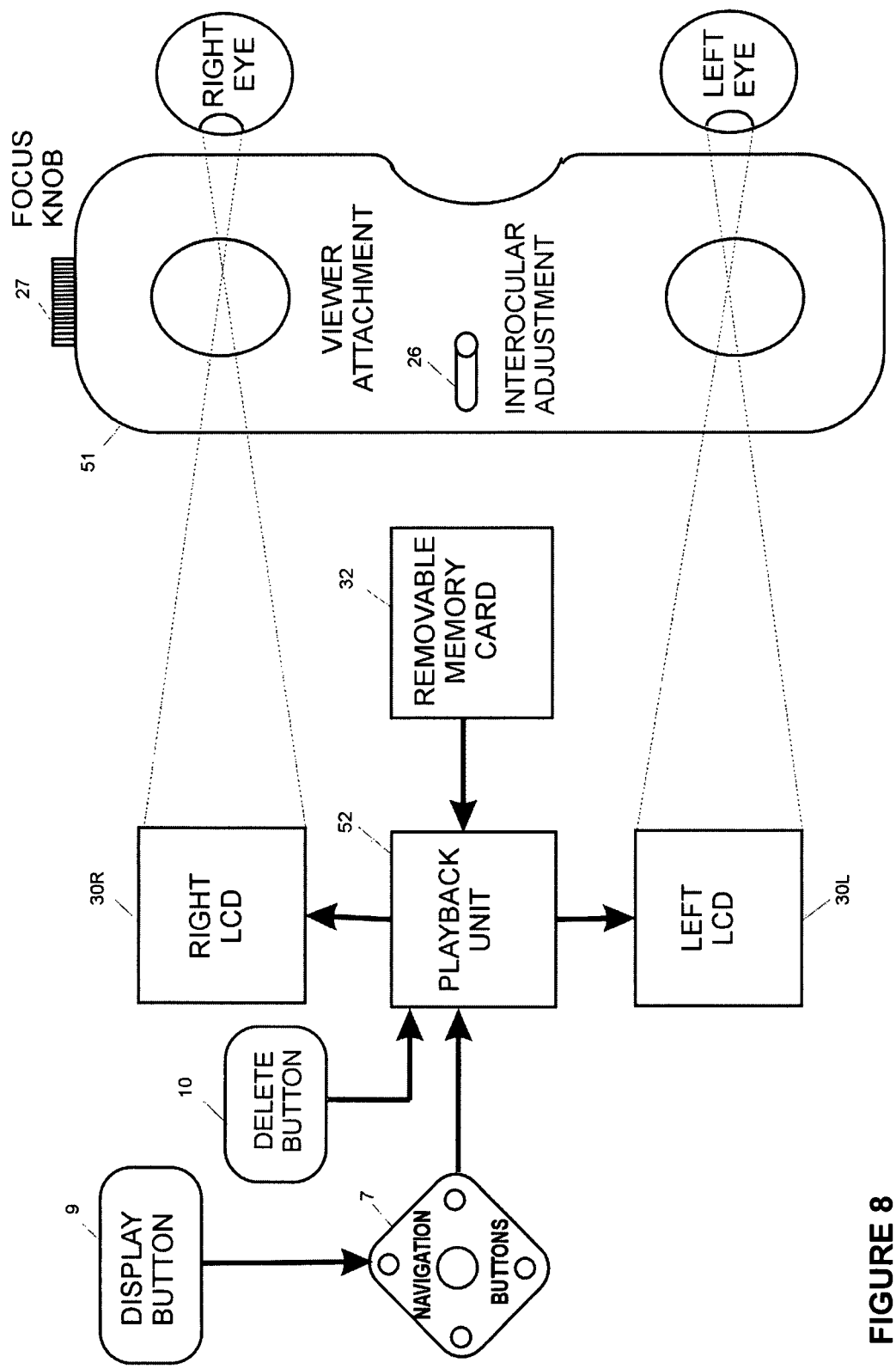
FIG. 8 is a block diagram illustrating the operation and flow of information in the camera and hand held viewer viewing mode.

Audio may added to each image, prior to exposure or after capture. The audio button 6 is pressed initially to enable the audio function, power up the amplifier 39 and to display "AUDIO ENABLED—PRESS TO START" on the LCD 30R. Pressing the audio button 6 again will start the recording and display, on the LCD 30R a countdown of the remaining time. After recording, "PRESS TO PLAY AUDIO" will be displayed on the LCD 30R for several seconds and pressing the button will play the audio. If not satisfied with the results, the process can be repeated, overwriting the previous recording. If recorded prior to exposure, the audio is saved on the removable memory card 32 with the next captured image. To record after capture, the display button 9 is pressed and the desired image selected with the navigation buttons 7 (as shown in FIG. 8), followed by the above procedure. Audio may also be added in a computer while editing.

Flash illumination may be selected by the menu to be on always, or as needed, using the internal flash unit 23 or an external flash attached to the hot shoe 20 (as shown in FIGS. 1 and 2). The duration of the internal flash is controlled by flash unit 21, measuring the light with the flash light sensor.

Viewing the image before capture may be done three ways—direct with your eye in the LCDs 30L and 30R or in 3D with the viewer attachment 51, and in addition with the viewfinder 12 (2 dimensional only).

Figure 7:
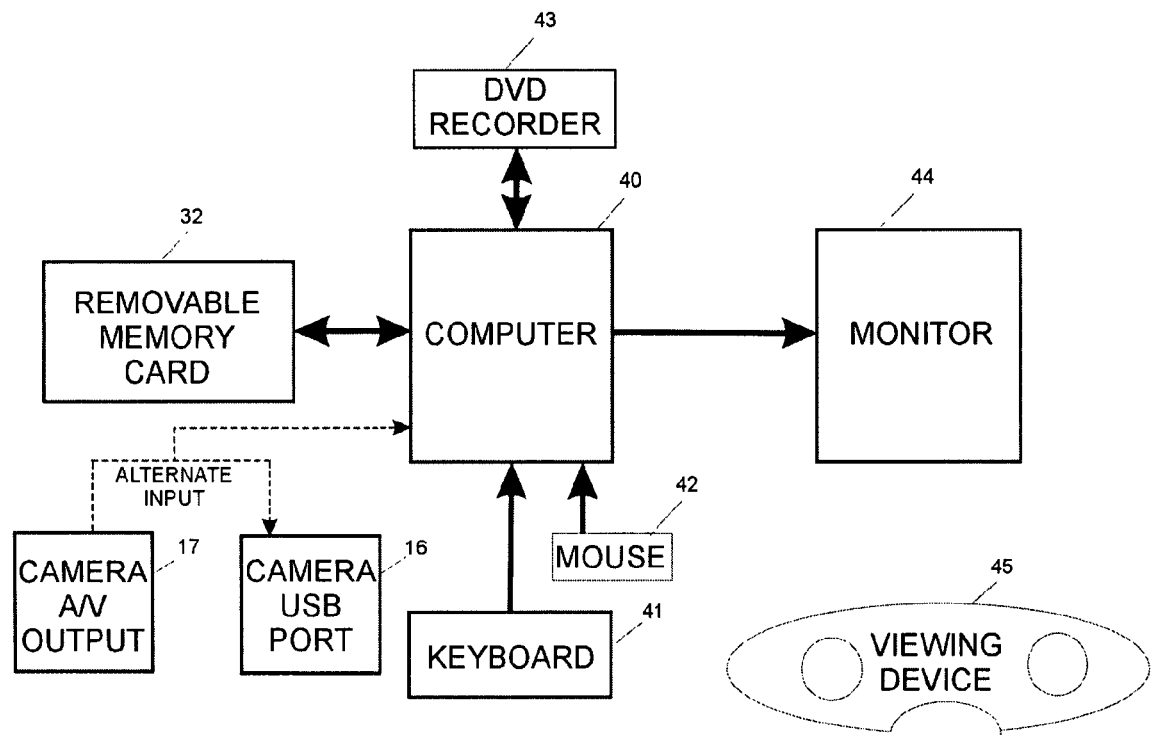
FIG. 7 is a block diagram illustrating the operation and flow of information in computer editing/viewing mode.

FIG. 7 illustrates the computer editing and viewing mode. Images on the removable memory card 32 may be downloaded to the computer 40 via a reader/writer device. The camera also includes an Audio/Video (A/V) port 17 and a Universal Serial Buss (USB) 16 that can be used with proper cabling to download to the computer 40. The computer 40 is used to display images on the monitor 44, and to edit images using software, the keyboard 41 and/or a mouse 42. The images may be viewed by eye on the monitor in 2 dimensions or in 3D using a viewing device or special glasses 45 or on a 3D computer/monitor such as the Sharp RD3D with the unaided eye. The software can also be used to create "slide shows" (a term from the film days) to assemble images into a sequence for presentation to viewers. The software provides the capability of uploading images or slide shows to a removable memory card, which can be inserted into the camera, the handheld viewer or a reader/writer device attached to another computer. Images or slide shows may be recorded on to a DVD disc via the computer DVD recorder 43 or on to a VHS tape using software that creates still images, in a movie format, alternating between left and right images.

FIG. 8 illustrates the viewing mode in the camera or in the handheld viewer. The removable memory card 32 is inserted into either device. Pressing the display button 9 enables the image display. The playback unit 52 processes the data from the card and displays the images on the LCDs 30L and 30R. Selection of the desired image is performed with the navigation buttons. Undesirable images may be removed from the memory card with the delete button 10. Images may be viewed individually or (when selected via the menu) in a slide show. If audio had been added, it will be heard in the speakers 23. Audio can also be added to the selected image in the hand held viewer. The images are viewed in 3D by using the viewer attachment 51 that works with the camera or the handheld viewer. Focusing is performed by rotating the focus knob 27. Interocular adjustment for eye separation is performed by rotating the lever 26.

Figure 9:
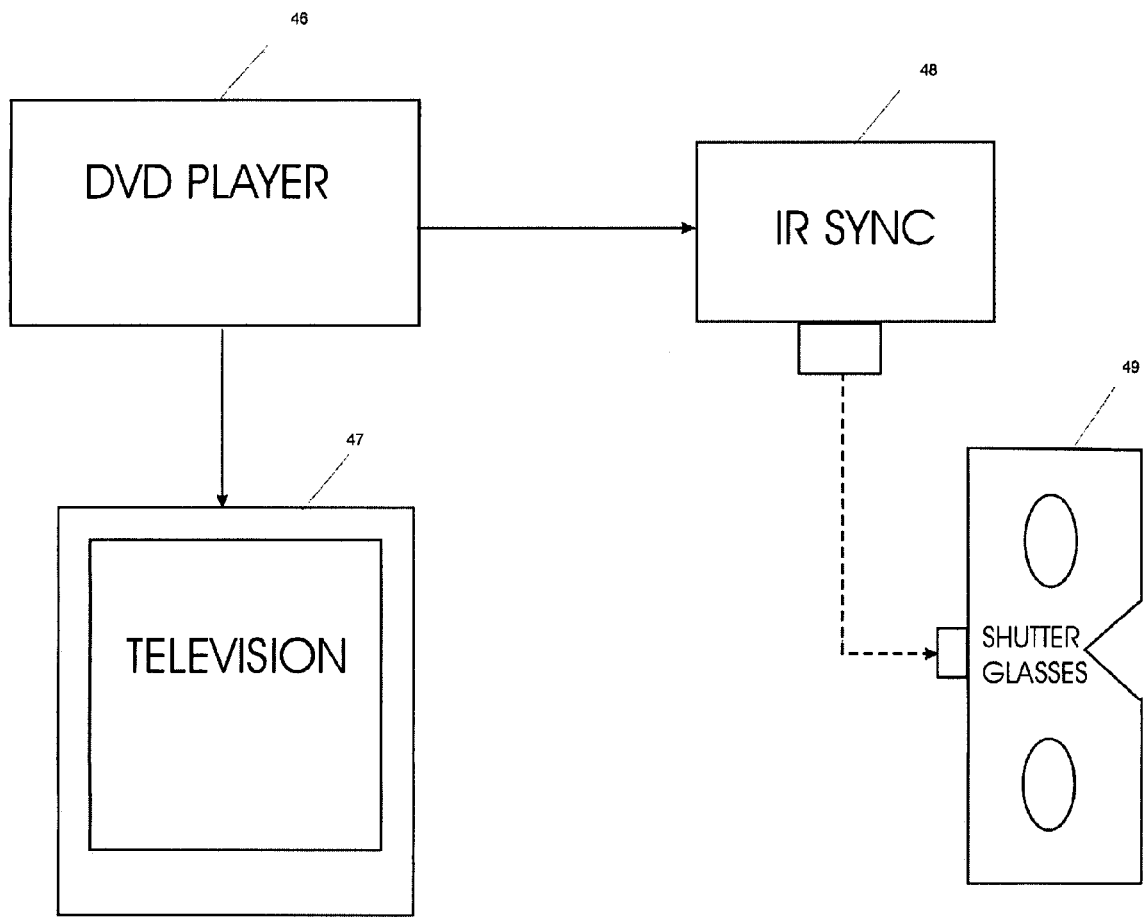
FIG. 9 is a block diagram illustrating the operation and flow of information in the TV viewing mode.

FIG. 9 illustrates the TV viewing mode. A DVD disc prepared as shown in FIG. 7 is inserted into an external standard DVD player or a VHS tape is inserted into an external standard Video Cassette Recorder (VCR). The DVD player or the VCR sends Audio/Video signals through an Infrared Synchronizing device 48 to a standard TV 47. This synchronizing device senses the alternating left and right images and sends an infrared signal to Liquid Crystal Shutter (LCS) glasses 49. The LCS glasses allow the TV image to pass through to the eyes or be blocked in synch with the alternating left and right images.

Figure 10:
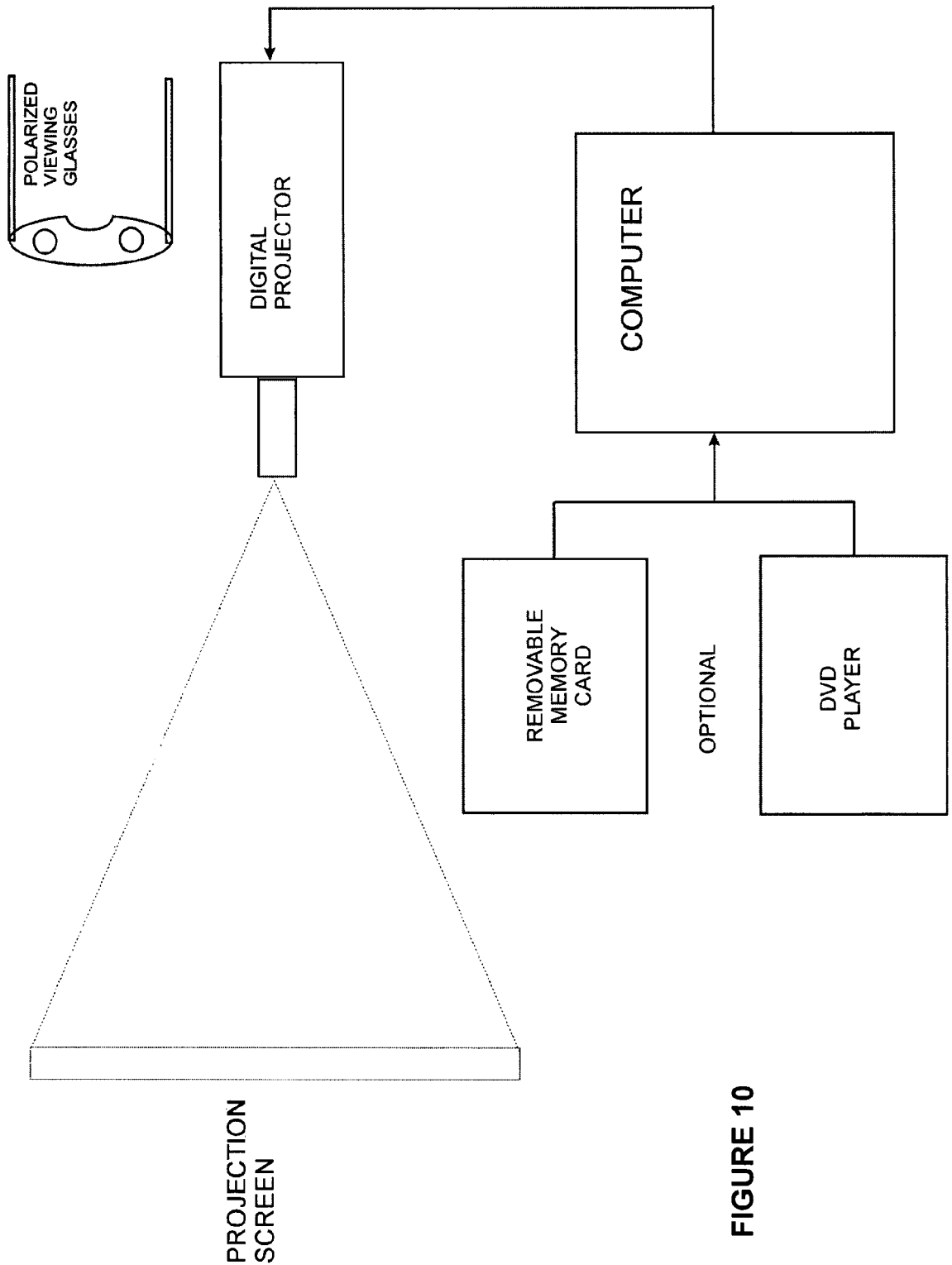
FIG. 10 illustrates the stereo projection mode.

FIG. 10 illustrates the projection mode that can be used for large or small audiences. Images saved or recorded to a removable memory card 32 or a DVD disc are downloaded to a computer or played through a computer. The left and right images are sent to a 3D digital projector or to two 2D digital projectors which in turn project the images onto a lenticular or flat panel screen. The projectors are fitted with polarized filters and polarized viewing glasses must be worn by the observers.

Figure 11:
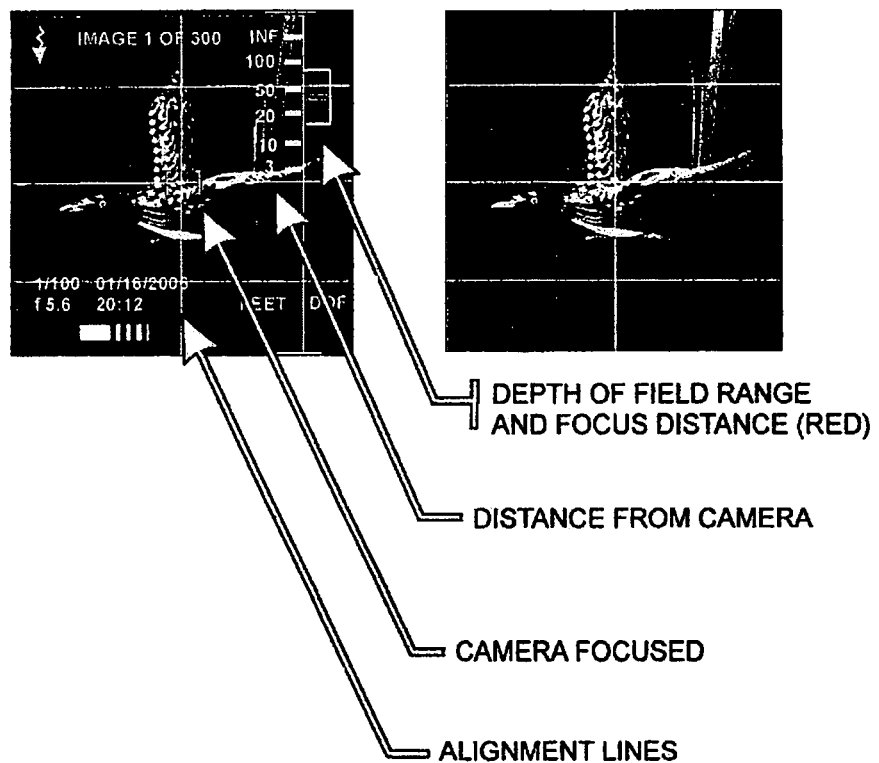
FIG. 11 illustrates the LCD displays of the camera in the Depth of Field (DOF) view.

FIG. 11 illustrates typical LCD 30L and 30R views in the Depth of Field (DOF) mode. With the viewer attachment 51 in place this view would be in 3 dimensions. In the DOF or Auto/DOF mode pressing the shutter button 3 half-way enables the capture mode. Moving the focus DOF lever 4 enables the DOF view. Rotating the DOF lever 4 will display the distance-from-camera scale, the DOF range and the focus distance. In addition, alignment lines will show to aid in aligning the photo. When the camera has automatically or manually focused an indication will appear. Other information displayed includes the date and time, image number, number of images remaining on the removable memory card 32, battery condition, f stop, and shutter speed.

Figure 12:
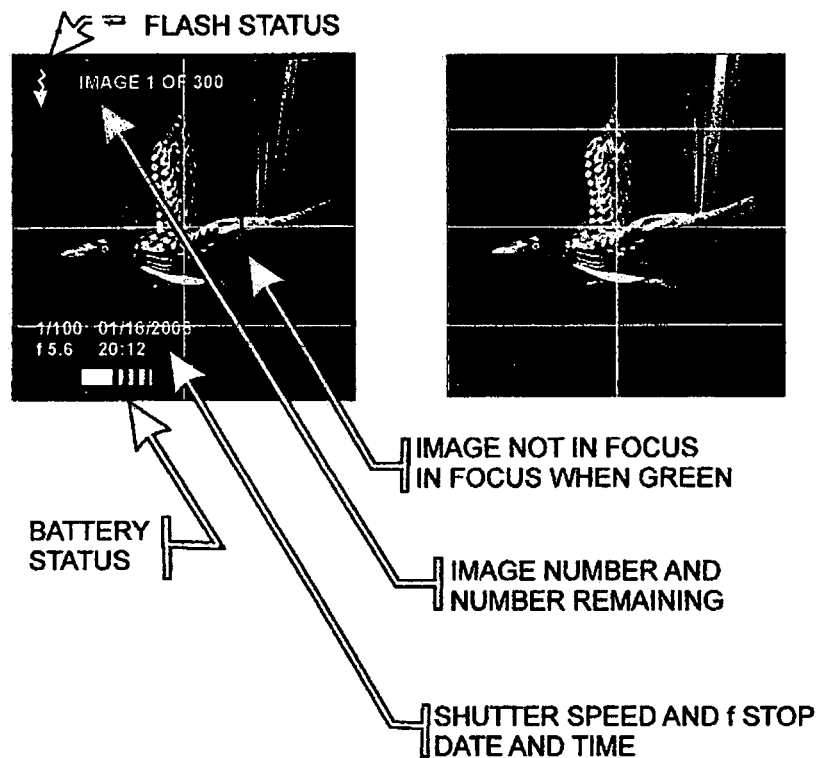
FIG. 12 illustrates the LCD displays of the camera in the Photo view.

FIG. 12 illustrates typical LCD 30L and 30R views in the Capture or Photo mode. This view is present after focusing or setting the DOF, and in the automatic focus/DOF mode. If the image is not in focus, a pair of parentheses in red appear. When the camera is focused manually or automatically, the parentheses change to green and moved closer together. The camera is now ready for exposure. Other information displayed includes image number, number of images remaining, f stop, shutter speed and battery status. Pressing the shutter button 3 again or fully captures the image and saves it on the removable memory card 32.

What is claimed is:

1. A stand-alone digital camera capable of taking three dimensional as well as two dimensional photographs, comprising:
    a pair of identical and linked lenses equipped with variable focus, variable aperture, and zoom capabilities;
    an image capture device for each of said lenses and in optical communication therewith;
    an image display for each of said image capture devices;
    a means for capturing an image passing through said lenses;
    a means for storing said captured image;
    a means for displaying said captured image on said image display;
    a means for recording audio before, during, and after capturing of said image; and
    a means to set Depth of Field.

2. The stand-alone digital camera of claim 1, wherein said image capture device is a charge coupled device (CCD).

3. The stand-alone digital camera of claim 1, wherein said image display is a liquid crystal display (LCD).

4. The stand-alone digital camera of claim 1, further comprising a viewer attachment removably positionable adjacent to said image viewers of said stand-alone digital camera to view said captured images displayed by said image viewers in 2D or 3D consisting of:
    a frame with space provisions for a user's nose;
    a pair of viewing lenses where said lenses are spaced apart similarly as said image displays of the stand-alone digital camera of claim 1;
    an adjustment for simultaneous focus of both lenses;
    an adjustment for micro focus of one lens;
    an adjustment for interocular spacing; and
    an adjustment lock to lock said adjustments.

5. The stand-alone camera of claim 1, further comprising capability to capture both left and right exposures simultaneously or capture left or right exposures individually to create hypo-stereo (large lens separation) or hyper-stereo (narrow lens separation) 3D images where the image of the first exposure is displayed on the corresponding image display when capturing the second exposure.

6. The stand-alone digital camera of claim 1, further comprising a built-in flash as well as a hot shoe enabling the use of an external flash unit.

7. A hand-held stereoscopic viewer, comprising:
    a pair of image displays, each said image display for viewing a separately captured image;
    a memory card slot;
    a switch for menu access, item selection, and navigation;
    a means to play audio associated with the image being viewed;
    a means to removably attach a viewer attachment;
    a means to power said hand-held stereoscopic viewer, such as battery or external DC adapter;
    a means to turn power on and off;
    a means for transferring data to or from said hand-held stereoscopic viewer; and
    a means for displaying said captured image on said image display.

8. A method of operating a digital stereo photographic system having a pair of matched and synchronized lenses; an image capture device for each of said lenses and in optical communication therewith; an image display for each of said image capture devices; a means for capturing an image passing through said lenses; a means for storing said captured image; a means for displaying said captured image on said image display, and software for use on a separate and stand-alone computer, said method comprising:
    passing an image through said lenses onto said image capture device;
    selecting the capability to add audio before or after exposure;
    capturing said image in a digital format;
    storing said captured image;
    displaying said captured image on said image display; and
    using computer software on a separate and stand-alone computer platform to modify standard 2D characteristics of brightness, contract, intensity, equalization, color, balance, gamma, hue/saturation, colors replacement, sharpness and 3D characteristics of horizontal, vertical, and rotational alignment, cropping, apparent window location control, and printing in 3D formats including side-by-side, over-under, anaglyph, pop-up phantograms, and standard stereoscopic cards (Holmes).

9. The method of claim 8 further comprising adding text in 3D format, where the depth position of said text relative to the window and scene is selectable by the user.

10. The method of claim 8 further comprising creating panoramic views by stitching two or more already existing 2D or 3D images.

11. The method of claim 8 further comprising transferring stereo images and slide shows to a CD, DVD, VHS tape, and other memory devices.

12. The method of claim 8, further comprising adding audio to corresponding images or movies before, during and/or after exposure in the camera.

13. The method of claim 12, further comprising playback of audio to images to be heard when its corresponding image is viewed.

14. The method of claim 8, further comprising erasing undesirable images from a memory card.

15. A stand-alone digital camera capable of taking three dimensional as well as two dimensional photographs, comprising:
- a pair of identical and linked lenses;
- an image capture device for each of said lenses and in optical communication therewith;
- an image display for each of said image capture devices;
- a means for capturing an image passing through said lenses;
- a means for storing said captured image; and
- a means for displaying said captured image on said image display wherein said pair of identical and linked lenses are equipped with variable focus, variable aperture, and zoom capability.

16. The stand-alone digital camera of claim 15 further comprising displaying image and camera information on an LCD, including distance from camera, Depth of Field, focus distance, camera focus status, alignment lines, battery status, shutter speed, f stop, date, time, image number identification, image number remaining in memory, etc. as illustrated in FIGS. 11 and 12.

17. The stand-alone digital camera of claim 15 further comprising a built-in flash as well as a hot shoe enabling the use of an external flash unit.

18. The stand-alone digital camera of claim 15 further comprising multiple ISO (International Organization for Standardization) speeds which can be selected from a menu.

19. The stand-alone digital camera of claim 15 further comprising a variety of exposure modes that are menu selectable including Automatic, aperture priority, shutter priority, and manual.

20. The stand-alone digital camera of claim 15, further comprising software for use on a stand-alone PC capable of;
- creating and editing slide shows; and
- transferring images and slide shows to CD, DVD, VHS, and USB based storage devices.

* * * * *